United States Patent
Walker et al.

(10) Patent No.: US 7,974,200 B2
(45) Date of Patent: Jul. 5, 2011

(54) TRANSMITTING AND RECEIVING REAL-TIME DATA

(75) Inventors: Matthew D Walker, Felixstowe (GB); Richard J Jacobs, Woodbridge (GB); Michael E Nilsson, Ipswich (GB)

(73) Assignee: British Telecommunications public limited company, London (GB)

( * ) Notice: Subject to any disclaimer, the term of this patent is extended or adjusted under 35 U.S.C. 154(b) by 1843 days.

(21) Appl. No.: 10/415,819

(22) PCT Filed: Nov. 28, 2001

(86) PCT No.: PCT/GB01/05246
§ 371 (c)(1),
(2), (4) Date: May 2, 2003

(87) PCT Pub. No.: WO02/45372
PCT Pub. Date: Jun. 6, 2002

(65) Prior Publication Data
US 2004/0153951 A1    Aug. 5, 2004

(30) Foreign Application Priority Data

Nov. 29, 2000 (EP) .................................. 00310594

(51) Int. Cl.
*H04J 1/16* (2006.01)
(52) U.S. Cl. .......................... 370/235; 725/87
(58) Field of Classification Search .......... 370/230, 370/329, 337, 342, 412, 441, 487, 229, 230.1, 370/231, 232, 233, 234, 235, 395.2, 395.21; 375/147, 240.01, 240.12; 709/229; 345/531; 348/390.1; 725/87, 93, 94, 96, 118, 119
See application file for complete search history.

(56) References Cited

U.S. PATENT DOCUMENTS
4,813,044 A  *  3/1989  Kumar et al. ................ 714/809
(Continued)

FOREIGN PATENT DOCUMENTS
EP         0 418 396 A1     3/1991
(Continued)

OTHER PUBLICATIONS

"Receiver-driven layered multicast", S. McCanne, V. Jacobson, and M. Vetterli, In Proc. ACM Sigcomm '96, pp. 117-130, Palo Alto, CA, Aug. 1996.

(Continued)

*Primary Examiner* — Ricky Ngo
*Assistant Examiner* — Kan Yuen
(74) *Attorney, Agent, or Firm* — Nixon & Vanderhye P.C.

(57) ABSTRACT

Real-time data (e.g. video) is streamed over packet networks (e.g. the Internet). Streamed video is provided without the start-up delay by transmitting data from a video streamer to the video viewer more rapidly than the video viewer consumes the data and using the excess data to build a buffer at the video viewer. When a suitable sized buffer is built the transmission rate of data to the buffer may be reduced. In order to deliver the best quality material for the available bandwidth, the supply of video data may be switched to a higher bit-rate source when the reservoir is filled. Fluctuations in network throughput may be accommodated during the transmission of data on a fine scale by adjusting the transmission rate of the data and on a coarse scale by switching between data streams encoded at different bit-rates. Fluctuations in network throughput are determined by counting the number of missing packets at the video viewer which information may then be fed back to the video streamer to adjust the flow of data accordingly.

12 Claims, 2 Drawing Sheets

U.S. PATENT DOCUMENTS

| | | | |
|---|---|---|---|
| 5,140,417 A * | 8/1992 | Tanaka et al. | 375/240.01 |
| 5,159,447 A * | 10/1992 | Haskell et al. | 375/240.05 |
| 5,363,138 A * | 11/1994 | Hayashi et al. | 348/390.1 |
| RE34,824 E * | 1/1995 | Morrison et al. | 348/419.1 |
| 5,511,054 A * | 4/1996 | Oishi et al. | 369/59.27 |
| 5,535,209 A | 7/1996 | Glaser et al. | |
| 5,561,466 A | 10/1996 | Kiriyama | |
| 5,566,208 A | 10/1996 | Balakrishnan | |
| 5,675,696 A * | 10/1997 | Ishimoto et al. | 386/112 |
| 5,706,504 A | 1/1998 | Atkinson et al. | |
| 5,748,955 A | 5/1998 | Smith | |
| 5,751,741 A | 5/1998 | Voith et al. | |
| 5,754,849 A | 5/1998 | Dyer et al. | |
| 5,818,818 A * | 10/1998 | Soumiya et al. | 370/252 |
| 5,822,524 A | 10/1998 | Chen et al. | |
| 5,864,678 A | 1/1999 | Riddle | |
| 5,874,997 A | 2/1999 | Haigh | |
| 5,892,881 A * | 4/1999 | Takishima et al. | 386/52 |
| 5,898,671 A | 4/1999 | Hunt | |
| 5,909,434 A * | 6/1999 | Odenwalder et al. | 370/342 |
| 5,915,130 A * | 6/1999 | Kim | 710/68 |
| 5,918,020 A * | 6/1999 | Blackard et al. | 709/228 |
| 5,928,330 A | 7/1999 | Goetz et al. | |
| 5,956,321 A * | 9/1999 | Yao et al. | 370/230 |
| 5,960,452 A | 9/1999 | Chi | |
| 6,011,779 A * | 1/2000 | Wills | 370/236 |
| 6,014,694 A | 1/2000 | Aharoni et al. | |
| 6,014,706 A | 1/2000 | Cannon et al. | |
| 6,023,732 A * | 2/2000 | Moh et al. | 709/232 |
| 6,061,732 A | 5/2000 | Korst et al. | |
| 6,065,104 A | 5/2000 | Tng | |
| 6,081,843 A | 6/2000 | Kikki et al. | |
| 6,092,115 A | 7/2000 | Choudhury et al. | |
| 6,097,697 A | 8/2000 | Yao et al. | |
| 6,104,441 A | 8/2000 | Wee et al. | |
| 6,122,668 A | 9/2000 | Teng et al. | |
| 6,124,878 A * | 9/2000 | Adams et al. | 725/118 |
| 6,181,821 B1 * | 1/2001 | Lim | 382/232 |
| 6,216,173 B1 | 4/2001 | Jones et al. | |
| 6,226,329 B1 * | 5/2001 | Ishibashi | 375/240.26 |
| 6,269,078 B1 | 7/2001 | Lakshman et al. | |
| 6,269,978 B1 | 8/2001 | Sindoni | |
| 6,275,534 B1 | 8/2001 | Shiojiri | |
| 6,285,661 B1 * | 9/2001 | Zhu et al. | 370/260 |
| 6,310,857 B1 * | 10/2001 | Duffield et al. | 370/232 |
| 6,324,165 B1 * | 11/2001 | Fan et al. | 370/232 |
| 6,373,855 B1 | 4/2002 | Downing et al. | |
| 6,411,602 B2 | 6/2002 | Schoenblum et al. | |
| 6,430,620 B1 | 8/2002 | Omura et al. | |
| 6,470,378 B1 | 10/2002 | Tracton et al. | |
| 6,480,448 B1 * | 11/2002 | Kawano et al. | 369/47.5 |
| 6,480,541 B1 * | 11/2002 | Girod et al. | 375/240.12 |
| 6,487,528 B1 * | 11/2002 | Vossing et al. | 704/229 |
| 6,493,388 B1 | 12/2002 | Wang | |
| 6,501,797 B1 | 12/2002 | van der Schaar et al. | |
| 6,532,242 B1 * | 3/2003 | Tahara | 370/487 |
| 6,573,907 B1 | 6/2003 | Madrane | |
| 6,593,930 B1 * | 7/2003 | Sheaffer et al. | 345/531 |
| 6,600,737 B1 * | 7/2003 | Lai et al. | 370/352 |
| 6,614,843 B1 | 9/2003 | Gordon et al. | |
| 6,618,363 B1 * | 9/2003 | Bahl | 370/329 |
| 6,618,381 B1 * | 9/2003 | Miyamoto et al. | 370/395.43 |
| 6,625,119 B1 * | 9/2003 | Schuster et al. | 370/230 |
| 6,637,031 B1 | 10/2003 | Chou | |
| 6,640,086 B2 | 10/2003 | Wall | |
| 6,661,777 B1 * | 12/2003 | Blanc et al. | 370/252 |
| 6,697,369 B1 * | 2/2004 | Dziong et al. | 370/395.2 |
| 6,700,893 B1 * | 3/2004 | Radha et al. | 370/412 |
| 6,701,372 B2 | 3/2004 | Yano et al. | |
| 6,731,097 B1 | 5/2004 | Richards et al. | |
| 6,738,386 B1 * | 5/2004 | Holmqvist | 370/412 |
| 6,744,815 B1 | 6/2004 | Sackstein et al. | |
| 6,754,189 B1 * | 6/2004 | Cloutier et al. | 370/329 |
| 6,778,499 B1 * | 8/2004 | Senarath et al. | 370/232 |
| 6,810,425 B2 | 10/2004 | Yamamoto | |
| 6,813,275 B1 | 11/2004 | Sharma et al. | |
| 6,850,564 B1 | 2/2005 | Pejhan et al. | |
| 6,909,693 B1 * | 6/2005 | Firoiu et al. | 370/235 |
| 6,920,178 B1 | 7/2005 | Curet et al. | |
| 6,940,903 B2 | 9/2005 | Zhao et al. | |
| 6,993,075 B2 | 1/2006 | Kim et al. | |
| 6,993,604 B2 * | 1/2006 | Dixon | 710/56 |
| 7,027,516 B2 | 4/2006 | Anderson et al. | |
| 7,058,723 B2 | 6/2006 | Wilson | |
| 7,106,758 B2 * | 9/2006 | Belk et al. | 370/503 |
| 7,116,714 B2 | 10/2006 | Hannuksela | |
| 7,142,509 B1 | 11/2006 | Rovner et al. | |
| 7,191,246 B2 | 3/2007 | Deshpande | |
| 7,380,015 B1 | 5/2008 | Nakajima et al. | |
| 7,444,419 B2 | 10/2008 | Green | |
| 7,542,435 B2 | 6/2009 | Leon et al. | |
| 7,761,901 B2 | 7/2010 | Walker et al. | |
| 2001/0001614 A1 | 5/2001 | Boice et al. | |
| 2001/0028463 A1 | 10/2001 | Iwamura | |
| 2001/0028789 A1 * | 10/2001 | Uchide | 386/111 |
| 2001/0040700 A1 | 11/2001 | Hannuksela et al. | |
| 2002/0002708 A1 | 1/2002 | Arye | |
| 2002/0007416 A1 | 1/2002 | Putzolu | |
| 2002/0009096 A1 * | 1/2002 | Odenwalder | 370/441 |
| 2002/0010938 A1 | 1/2002 | Zhang et al. | |
| 2002/0016827 A1 | 2/2002 | McCabe et al. | |
| 2002/0038374 A1 | 3/2002 | Gupta et al. | |
| 2002/0041585 A1 * | 4/2002 | Bahl | 370/337 |
| 2002/0057889 A1 | 5/2002 | Ando et al. | |
| 2002/0083184 A1 | 6/2002 | Elliott | |
| 2002/0114292 A1 * | 8/2002 | Kawabata et al. | 370/329 |
| 2002/0131408 A1 | 9/2002 | Hsu et al. | |
| 2002/0131496 A1 | 9/2002 | Vasudevan et al. | |
| 2002/0167942 A1 | 11/2002 | Fulton | |
| 2003/0037158 A1 | 2/2003 | Yano et al. | |
| 2003/0072370 A1 * | 4/2003 | Girod et al. | 375/240.13 |
| 2003/0076858 A1 | 4/2003 | Deshpande | |
| 2003/0103515 A1 * | 6/2003 | Brown et al. | 370/412 |
| 2003/0153311 A1 * | 8/2003 | Black | 455/436 |
| 2003/0169932 A1 | 9/2003 | Li et al. | |
| 2003/0174609 A1 | 9/2003 | Choi | |
| 2004/0049793 A1 * | 3/2004 | Chou | 725/87 |
| 2004/0078460 A1 | 4/2004 | Valavi et al. | |
| 2004/0114684 A1 | 6/2004 | Karczewicz et al. | |
| 2004/0181817 A1 | 9/2004 | Larner | |
| 2004/0190600 A1 * | 9/2004 | Odenwalder | 375/147 |
| 2005/0010697 A1 | 1/2005 | Kinawi et al. | |
| 2005/0021830 A1 | 1/2005 | Urzaiz et al. | |
| 2005/0044254 A1 | 2/2005 | Smith | |
| 2005/0120038 A1 | 6/2005 | Jebb et al. | |
| 2005/0172028 A1 | 8/2005 | Nilsson et al. | |
| 2005/0191038 A1 * | 9/2005 | Ogawa et al. | 386/112 |
| 2006/0064501 A1 * | 3/2006 | Harris et al. | 709/232 |
| 2006/0133514 A1 | 6/2006 | Walker | |
| 2006/0171666 A1 | 8/2006 | Im | |
| 2006/0182016 A1 | 8/2006 | Walker et al. | |
| 2008/0250454 A1 | 10/2008 | Nishina et al. | |
| 2009/0116551 A1 | 5/2009 | Nilsson et al. | |
| 2009/0133075 A1 | 5/2009 | Nishina et al. | |

FOREIGN PATENT DOCUMENTS

| | | |
|---|---|---|
| EP | 0 763 944 A2 | 3/1997 |
| EP | 0 939 545 A2 | 9/1999 |
| EP | 0 948 211 A2 | 10/1999 |
| EP | 1 045 555 A2 | 10/2000 |
| EP | 1 120 966 A2 | 8/2001 |
| EP | 1 128 610 A2 | 8/2001 |
| EP | 1 130 921 A1 | 9/2001 |
| EP | 1241891 A | 9/2002 |
| GB | 2 363 277 A | 10/2000 |
| GB | 2367219 A | 3/2002 |
| JP | 07 0123172 | 5/1995 |
| JP | 7-236136 | 9/1995 |
| JP | 7-264580 | 10/1995 |
| JP | 7-303117 | 11/1995 |
| JP | 9-93553 A | 4/1997 |
| JP | 9-261613 | 10/1997 |
| JP | 9-298734 | 11/1997 |
| JP | 10-126771 | 5/1998 |
| JP | 10-164533 | 6/1998 |
| JP | 10-262245 A | 9/1998 |
| JP | 11-164270 | 6/1999 |

| | | |
|---|---|---|
| JP | 11-184780 | 7/1999 |
| JP | 11-187367 | 7/1999 |
| JP | 11-239163 | 8/1999 |
| JP | 11-308271 | 11/1999 |
| JP | 11-313301 | 11/1999 |
| JP | 2000-151705 | 5/2000 |
| JP | 2000-183958 | 6/2000 |
| JP | 2000-228669 | 8/2000 |
| JP | 2001-144802 | 5/2001 |
| KR | 2000-28335 | 5/2000 |
| WO | WO 98/26604 | 6/1998 |
| WO | 00/001151 | 1/2000 |
| WO | WO 00/01151 | 1/2000 |
| WO | 00/35201 | 6/2000 |
| WO | WO00/35201 | 6/2000 |
| WO | WO 00/41365 | 7/2000 |
| WO | WO 00/49810 | 8/2000 |
| WO | WO 00/62552 | 10/2000 |
| WO | WO 01/39508 A1 | 5/2001 |
| WO | WO 02/054776 A1 | 7/2002 |

OTHER PUBLICATIONS

"TCP-like congestion control for layered multicast data transfer", L. Vicisano, L. Rizzo, J. Crowcroft, In Proc. IEEE Infocom '98, vol. 3, pp. 996-1003, San Francisco, CA, Mar. 1998.
"Layered audiovisual coding for multicast distribution on IP networks", J. O. M. Nilsson, D. Dalby, in $6^{th}$ IEEE, European Workshop on distributed Imaging, Nov. 1999.
"Viewer response to time-varying video quality", D. Pearson, In Human Vision and Electronic Imaging III (B.E. Rogowitz and T. N. Pappas, eds.), vol. Proc. SPIE, vol. 3299, (San Jose, CA), pp. 16-25, Jan. 1998.
"Two-layer coding of video signals for VBR networks", M. Ghanbari, IEEE Journal on Selected Areas of Communications, vol. 7, No. 5, pp. 771-781, Jun. 1989.
"Retransmission Scheme for MPEG Streams in Mission Critical Multimedia Applications", Sugh-Hoon Lee, Sungyoung Lee, EUROMICRO 1998, pp. 574-580.
"Error-resilient video transmission using long-term memory motion-compensated prediction", T. Wiegand, N. Farber, K. Stuhlmuller, B. Girod, IEEE Journal on Selected Areas in Communications, vol. 18, No. 6, Jun. 2000, pp. 1050-1062.
"Connections with multiple congested gateways in packet-switched networks, part 1: one-way traffic", S. Floyd, ACM Computer Communications Review, vol. 21, No. 5, pp. 30-47, Oct. 1991.
"TCP-Friendly Unicast Rate-Based Flow Control", J. Mandavi and S. Floyd, Available from http://www.psc.edu/networking/papers/tcp_friendly.html, Jan. 1997.
"TCP Congestion Control", M. Allman, V. Paxson, W. Stevens, Internet Engineering Taskforce Request for Comment 2581, posted on the Internet Engineering Taskforce Internet site at http://www.ietf.org/rfc/rfc2581.txt.
Rejaie et al, "Quality Adaptation for Congestion Controlled Video Playback over the Internet", Proc. ACMSIGCOMM '99, Aug.-Sep. 1999.
Rejaie et al., "RAP: An End-to-end Rate-based Congestion Control Mechanism for Realtime", Proc. IEEE Infocom, Mar. 1999.
Walker et al., "A Study of the Efficiency of Layered Video Coding Using H.263," Proc. of Packet Video 99, The 9th International Packet Video Workshop, New York, Apr. 1999, pp. 1-10.
Morrison et al., "Reduction of the Bit-Rate of Compressed Video While In Its Coded Form," In Sixth International Workshop on Packet Video; Portland, Oregon; Sep. 1994, 4 pages.
European Search Report—Oct. 11, 2002 in EP 02252216.
International Search Report—Jul. 5, 2004 in PCT/GB2004/000974.
International Search Report—Jun. 21, 2002 in PCT/GB 01/05246.
International Search Report—May 21, 2003 in PCT/GB 03/01358.
International Search Report—Dec. 10, 2002 in PCT/GB 02/04203.
Rejaie et al., "Layered Quality Adaptation for Internet Video Streaming", IEEE Journal on Selected Areas in Communications, Dec. 2000, IEEE, USA, vol. 18, No. 12, pp. 2530-2543.
Sisalem et al., "MLDA:A TCP-Friendly Congestion Control Framework for Heterogeneous Multicast Environments", International Workshop on Quality of Service (IWQOS)—Conference Proceedings Article, Jun. 5, 2000, pp. 65-74.
Kurceren et al., Synchronization-Predictive Coding for Video Compression: The SP Frames Design for JVT/H.26L, IEEE ICIP 2002.
Postel, Transmission Control Protocol, Prepared for Defense Advanced Research Projects Agency, Information Processing Techniques Office, 1400 Wilson Boulevard, Arlington, Virginia 22209, Jan. 1980.
International Search Report—Dec. 16, 2002 in PCT/GB 02/04182.
Bolot et al.; "Experience with Control Mechanisms for Packet Video in the Internet", XP000751635, Computer Communication Review, ACM SIGCOMM, 2004, pp. 4-15.
Office Action dated Oct. 3, 2008 in U.S. Appl. No. 10/507,111.
Office Action dated Dec. 17, 2007 in U.S. Appl. No. 10/507,111.
Office Action dated Aug. 16, 2007 in U.S. Appl. No. 10/507,826.
Office Action dated Mar. 25, 2008 in U.S. Appl. No. 10/507,826.
Office Action dated Sep. 4, 2008 in U.S. Appl. No. 10/507,826.
Office Action dated Aug. 22, 2006 in U.S. Appl. No. 10/508,122.
Office Action dated Feb. 20, 2007 in U.S. Appl. No. 10/508,122.
Office Action dated Aug. 14, 2007 in U.S. Appl. No. 10/508,122.
Office Action dated Nov. 1, 2007 in U.S. Appl. No. 10/508,122.
Office Action dated Jun. 20, 2008 in U.S. Appl. No. 10/508,122.
Office Action dated Dec. 30, 2008 in U.S. Appl. No. 10/508,122.
Office Action dated Aug. 27, 2007 in U.S. Appl. No. 10/488,345.
Office Action dated Feb. 1, 2008 in U.S. Appl. No. 10/488,345.
Office Action dated Sep. 11, 2008 in U.S. Appl. No. 10/488,345.
Office Action dated Mar. 31, 2008 in U.S. Appl. No. 10/549,582.
Office Action dated Sep. 30, 2008 in U.S. Appl. No. 10/549,582.
Sullivan et al., "Using the Draft H.26L Video Coding Standard for Mobile Applications," IEEE Image Processing 2001 International Conference.
Karcewicz et al., "VCEG-L27" ITU-Telecommunications Standardization Sector, Jan. 4, 2001.
Postel, "Transmission Control Protocol," Prepared for Defense Advanced Research Projects Agency, Information Processing Techniques Office, 1400 Wilson Boulevard, Arlington, Virginia 22209, Jan. 1980.
Naoki Wakayama et al., "On TCP-friendly Video Transfer", IEICE Technical Report, vol. 99 No. 428, Nov. 15, 1999, pp. 79-84.
Kurceren R. et al: "Improved SP-frame Encoding. VCEG-M73." ITU Telecommunications Standardization Sector Video Coding Experts Group, Apr. 2, 2001, pp. 1-5.
Office Action dated Apr. 6, 2009 in U.S. Appl. No. 10/549,582.
Office Action dated Jun. 23, 2009 in U.S. Appl. No. 10/488,345.
Office Action dated Apr. 13, 2009 in U.S. Appl. No. 10/508,122.
Office Action dated Jun. 25, 2009 in U.S. Appl. No. 10/507,826.
Office Action (21 pgs.) dated May 28, 2010 in U.S. Appl. No. 10/488,345.
Office Action (13 pgs.) dated Apr. 13, 2010 in U.S. Appl. No. 10/507,826.
Applicant Response (33 pgs.) to Office Action dated Jun. 23, 2009 in U.S. Appl. No. 10/488,345.
Applicant Response (4 pgs.) to Office Action dated Jun. 25, 2009 in U.S. Appl. No. 10/507,826.
Office Action (11 pgs.) dated Jan. 13, 2010 in U.S. Appl. No. 10/508,122.
Office Action (8 pgs.) dated Aug. 3, 2009 in U.S. Appl. No. 10/549,582.
Applicant Response (10 pgs.) to Office Action dated Aug. 3, 2009 in U.S. Appl. No. 10/549,582.
Kim, et al., "Network-Aware Error Control Using Smooth and Fast Rate Adaptation Mechanism for TCP-Friendly Internet Video," IEEE, pp. 320-325 (2000).
Wu et al., "The core experiment on the SP frame coding," Joint Video Team (JVT) of ISO/IEC MPEG & ITU-T VCEG, $2^{nd}$ meeting Geneva, CH, Jan. 29-Feb. 1, 2002, document: JVT-B112, Feb. 3, 2002, Microsoft Nokia.
Office Action mailed Apr. 2, 2010 in U.S. Appl. No. 12/230,550.
Notice of Allowance mailed Mar. 12, 2010 in U.S. Appl. No. 10/549,582.
Office Action mailed Feb. 3, 2009 in U.S. Appl. No. 10/507,826.

* cited by examiner

TRANSMITTING AND RECEIVING REAL-TIME DATA

This application is the U.S. national phase of international application PCT/GB01/05246 filed 28 Nov. 2001 which designated the U.S.

BACKGROUND

1. Technical Field

The invention is in the field of handling of time-sensitive data over packet switched networks, and more particularly transmitting and receiving video data over the Internet.

The invention relates to a method of providing a streaming video service to a client across a packet network whilst reducing the start-up delay usually associated with preparing a buffer of data while maintaining the use of a buffer. The invention also relates to a method of controlling the transmission rate of the streaming video to adapt to congestion in the network.

2. Related Art

Traditionally the Internet has supported traffic such as FTP, e-mail and web-surfing, where the overall delay does not intrinsically detract from the final presentation of the media. The advent of faster processing multimedia PC's has driven the delivery of multimedia, including video, over the Internet. Time-sensitive applications however require continuous, quality of service guaranteed, high bandwidth data channels, which is seemingly at odds with the packet-based nature of the Internet and has the potential to disrupt transmissions with unacceptable packet jitter, i.e. the variation in the inter-arrival times of packets caused by variable routing and changeability of delivery rates owing to congestion. Currently, commercial streaming technologies overcome jitter by constructing a large buffer (5-30 seconds) before starting to playback video material. This start-up delay is non-optimal for a user, who may have to wait for this period, before realizing that the content requested is incorrect; and generally detracts from the users experience of the multimedia presentation.

BRIEF SUMMARY

According to a first aspect of the present invention there is provided a method of operating a real-time communication apparatus comprising a real-time data sender, a real-time data display device having a store and a network connecting said sender and said display device, said method comprising the steps of:

operating said sender to transmit a plurality first-encoding-rate data packets representing a first part of a real-time presentation to said display device, said transmission rate being higher than said encoding rate;

operating said display device to:

receive said first-encoding-rate data packets into said store;

remove first-encoding-rate data packets from said store at said first encoding rate for decoding to present said real-time presentation to said user at a first level of quality;

on said store being filled with said first-encoding-rate data to a predetermined level, sending an indication that said level has been reached to said sender;

operating said sender, on receipt of said indication, to send second-encoding-rate data packets representing subsequent parts of said real-time presentation to said display device, said second encoding rate being higher than said first encoding rate;

operating said display device to:

receive second-encoding-rate data packets representing a subsequent part of real-time presentation into said store;

remove second-encoding-rate data packets from said store at said second encoding rate for decoding to present said real-time presentation to said user at a second level of quality higher than said first level of quality.

According to another aspect of the present invention there is provided a method of presenting time-sensitive data at a client while constructing a buffer of time-sensitive data, said method comprising receiving time-sensitive data which has been transmitted to said client, passing said time-sensitive data to a data buffer; and, monitoring the quantity of time-sensitive data in the data buffer; reading said time dependent data out of the data buffer to be processed for viewing; wherein the method is characterised in that the rate at which the time-sensitive data is read out of the data buffer is lower than the rate at which the time-sensitive data is passed to th data buffer; and the time-sensitive data is read out of the data buffer when it arrives in the data buffer, such that there is substantially no delay between the client receiving the time-sensitive data and making the time-sensitive data available; and, presenting the time-sensitive data.

There will come a point when the data buffer becomes sufficiently full. The rate of transmission can then be reduced to equal the rate of consumption by the viewing means which will bring the quantity of data in the buffer to an equilibrium. However, in this situation the bandwidth of the connection may not be employed to full capacity.

In a further aspect of the present invention there is provided a method of presenting time-sensitive data at a client, wherein, time-sensitive data encoded at a first bit-rate is received until a pre-determined quantity of data fills the data buffer, whereupon time-sensitive data encoded at a second bit-rate is received, wherein said second bit-rate is higher than the first bit-rate.

A still further aspect of the present invention provides a method of providing time-sensitive data to a client is taught, wherein time-sensitive data encoded at a first bit-rate is read from a first data buffer at a first transmission rate to be transmitted to the client; and, upon request, time-sensitive data encoded at a second bit-rate is read from a second data buffer at a second rate.

It is desirable to use as much of the available bandwidth of a link as possible to transmit data because with a higher bit-rate of video data comes better quality reproduction. However, loss of data in the network causes severe degradation of service—far outstripping the benefits of increased bit-rate. For example, with predictive coding schemes such as H.263 and MPEG, receiving half of a 500 kbits$^{-1}$ video stream is likely to give a much worse quality than all of a 250 kbits$^{-1}$ stream. It is therefore important to reduce transmission rate in a controlled way, rather than letting data be lost to the network. The Internet protocol TCP has a built-in control mechanism whereby the data transmission rate is steadily increased until packet loss is detected, whereupon the data rate is reduced. The data rate is then increased again until packet loss reoccurs. A variable transmission rate is said to be elastic and applications which are able to control the transmission rate of data in response to network conditions are said to be TCP-friendly. It is desirable to provide video data in a TCP-friendly way so that the as much of the bandwidth available at any particular time is utilised. A further benefit of TCP-friendly data delivery is that congestion in the network is managed as individual applications themselves reduce data rates until each has a fair share of the bandwidth.

Standard compression technologies, such as MPEG4 or H.263 can be managed to exhibit TCP-friendly behaviour, see for example the applicant's co-pending patent application number GB 9928023.2. This solution, however, requires a high-speed, dedicated PC per video stream. Transcoding an encoded data stream from a high bit-rate to a low bit-rate when network congestion is detected also suffers from the problem of being computationally demanding. Another approach is to use layering of video streams, whereby quality adaption is achieved by adding or dropping layers of the video stream. The disadvantage of this method is that it is inefficient, as a certain proportion of the available bandwidth must be allocated to instructions for integrating the layers.

The present invention further provides a method wherein the rate at which time-sensitive data is read out from first and second buffers may be dynamically varied in dependence upon the condition of a link to the client, and further, time-sensitive data encoded at a first bit-rate is read from a first data buffer at a first transmission rate to be transmitted to the client; or, time-sensitive data encoded at a second bit-rate is read from a second data buffer at a second rate, in dependence upon the condition of a link to the client, wherein said first bit-rate is lower than the second bit-rate.

BRIEF DESCRIPTION OF THE DRAWINGS

Embodiments of the invention will now be described, by way of example only, with reference to the figures, where.

DETAILED DESCRIPTION OF EXEMPLARY EMBODIMENTS

Figure 1:
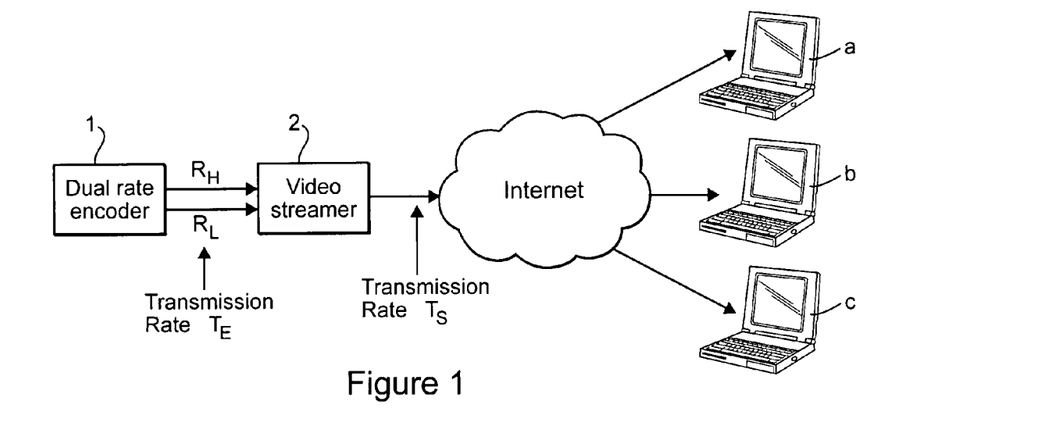
FIG. 1 is a schematic overview of the relationship between encoder, video streamer and clients.

As shown in FIG. 1, a first embodiment of the present invention consists of a source of compressed video data, encoder 1, which encodes data both at a low bit-rate $R_L$, which may have a value of for example 500 kbits$^{-1}$, and a high bit-rate $R_H$, of for example 1500 kbits$^{-1}$. The compression codec used is H.263 but equally may be any other codec, such as MPEG4. Encoder 1 takes 'live' video data as its input, for instance a broadcast of a sporting event.

The two encoded data streams are transmitted via separate logical connections to the video streamer 2 at a transmission rate TE. The video streamer 2 may be on the same premises as the encoder 1 and linked via an intranet. The video streamer 2 runs on a server computer, for instance one comprising a Pentium III 700 MHz, 256 MB RAM which has access to the Internet.

A video viewer, hitherto referred to as the client, running on a PC (a, b, c etc in FIG. 1) suitably configured to have access to the Internet, may connect to the video streamer 2 via the Internet and thus the client is able to access content. A suitable PC terminal is a 266 MHz Pentium II laptop PC. The video streamer 2 can support a large number of clients (typically up to 1000) viewing the same stream.

For a live broadcast, the encoder 1 will transmit at a transmission rate TE which is real-time. The two streams of data $R_L$ and $R_H$ coded at different bit-rates offer different quality video reproduction, but each data stream has the same transmission rate, $T_E$. The data must be decoded at this rate for the program to play back in real-time.

Figure 2:
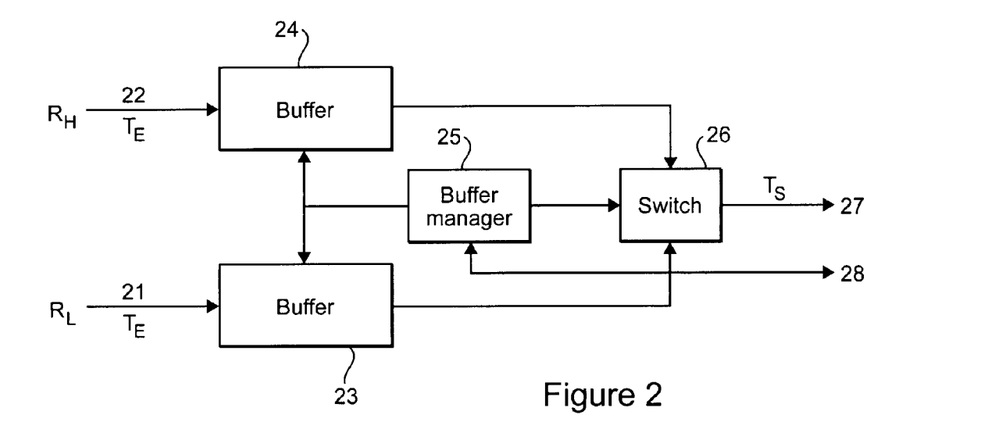
FIG. 2 shows the arrangement of the video streamer.

FIG. 2 shows the arrangement of the video streamer 2. Low quality encoded video data encoded at a low bit-rate $R_L$ and high quality encoded video data encoded at a high bit-rate $R_H$ from the encoder 2 is received at the input connections 21 and 22 respectively and fed to buffers 23 and 24 respectively. It should be noted that there is provided one buffer per channel of encoded video data that is received by the video streamer 2. Encoded video data is read out from each buffer 23, 24 via a switch 26 which selects which encoded video data stream is to be sent to the output connection 27. There is provided a buffer manager 25 which is capable of controlling the rate at which data is read out from each of the buffers 23, 24 and thus defines the transmission rate $T_S$ of the video streamer 2. The buffer manager is also in connection with the switch 26 and is further capable of receiving signals from connection 28. $T_S$ is selected by varying the time delay between the transmission of each packet, such that $T_S$ may be less than, equal to or greater than the encoder transmission rate $T_E$. Those skilled in the art will realise that the limiting factor on the sustainability of transmission where $T_S > T_E$ is the size of the buffer 23, 24 such that a buffer of size S kbits will be able to sustain a transmission rate of $T_S = 2T_E$ for twice as long as a buffer of size S/2 kbits. Through the control of both switch 26 and the transmission rate Ts the buffer manager is able to control the bit-rate which is output from the video streamer 2 on two scales; by adjusting the transmission rate $T_S$ fine control of the bit-rate is achieved, and by switching between the two encoded data streams encoded at bit-rates $R_L$ and $R_H$ control of the bit-rate on a coarse scale may be achieved. The buffer manager 25 makes adjustments to $T_S$ or switches the output between buffers in response to signals received from connection 28.

Figure 3:
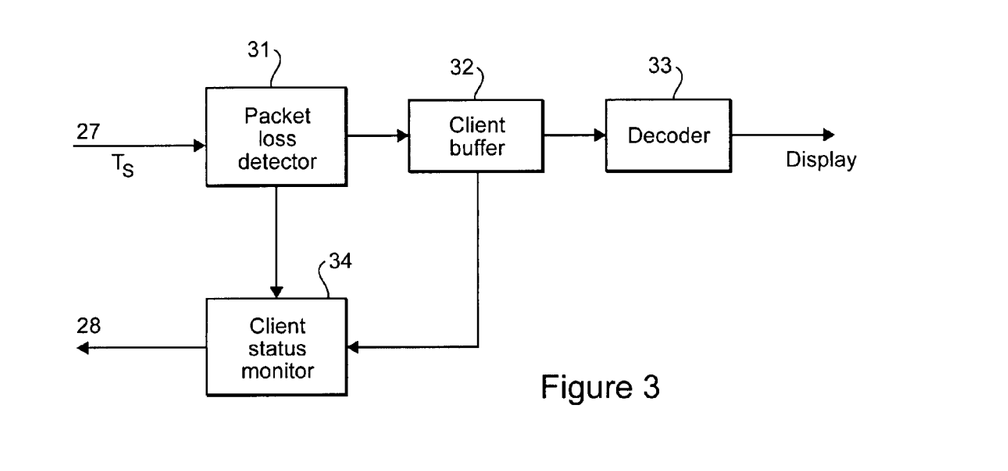
FIG. 3 shows the arrangement of a client.

FIG. 3 shows the arrangement of the client running on a PC 3a, b, c etc. The encoded video data that is sent from the video streamer 2 is received at the client via a connection 27 and checked for completeness by a packet loss detector 31. The data is then sent into a client buffer 32 which is of a size suitable to absorb fluctuations in network throughput. The client buffer 32 is connected directly to a decoder 33 and from there decoded data is sent to be displayed at the client screen (not shown). A client status monitor 34 is connected to the packet loss detector 31 and client buffer 32. The client status monitor 34 is able to send signals via connection 28.

The packet loss detector 31 monitors incoming packets. If packet loss is detected then a signal is sent to the client status monitor 34, which is informs the buffer manager at the video streamer 2 via connection 28. Missing packets can be retransmitted. The buffer manager 25 steadily increases the transmission rate Ts until a consistent pattern of packet loss occurs, indicating that the maximum bandwidth is being utilised. In the interest of maintaining a congestion free network, the transmission rate Ts may then be exponentially reduced. The client status monitor 34 monitors the volume of data in the client buffer 32 such that a signal is sent via connection 28 to the buffer manager 25 at the video streamer 2 when the client buffer 32 becomes sufficiently full of data.

The system of video streamer 2 and client 3 as described above allows user-friendly video streaming, i.e. the client buffer 32 enables the quality of the video to be despite variations in network conditions, which might otherwise have a detrimental effect on the overall perceived quality of the media.

Figure 4:
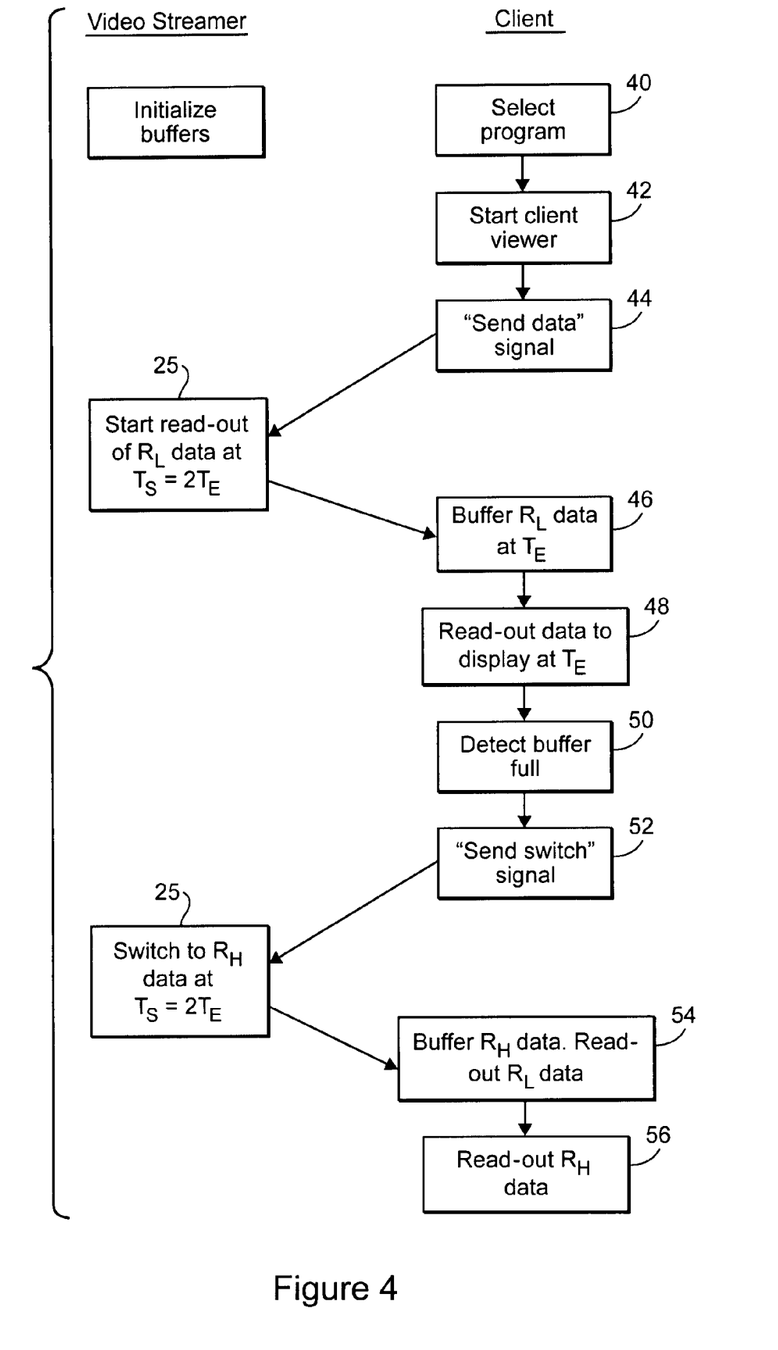
FIG. 4 shows the stepwise operation of one embodiment of the present invention.

The operation of the present embodiment of the invention will now be described with reference to FIG. 4.

The video streamer 2 is initialised, which involves filling the buffers 23, 24 with a quantity of data from the encoder 1. For a live broadcast, data is constantly fed into the buffers 23, 24 and is subsequently discarded after an amount of time defined by the size of the buffer and the quality of data being received.

A PC running browser software to browse web pages on the Internet may be used to select a link to, for example, a live broadcast on a site hosted by the entity providing streamed video. Being interested in viewing the particular clip or broadcast, the user clicks (selects) the link at 40. The browsing software detects that streamed video data has been requested and launches the video viewing client software at 42 which embodies the client 3. The client 3 issues a "send data" command at 44 via connection 28 to the buffer manager 25, which sets switch 26 to read encoded video data from the low bit-rate data buffer 23 and requests a transmission rate of $T_s=2T_E$. The data is transmitted to the data connection 27 and thence to the client 3. Using the example encoding bit-rate cited above of 500 kbits$^{-1}$ for $R_L$, data flows into the network to the client at a rate of 1000 kbits$^{-1}$.

The client 3 receives the encoded video data at 46 and sends it via the packet loss detector 31 to the client buffer 32 which is supplied at the rate $2T_E$. When data is detected in the buffer 32 the encoded video data is promptly read out at 48 to the decoder 33 at a rate of $T_E$. Therefore the buffer 32 fills at a rate $T_E$ while the decoded data from the decoder 33 is displayed. Thus the user is provided with video pictures without having to wait for the client buffer 32 to fill.

The client monitor 34 waits at 50 for the quantity of $R_L$, data in the client buffer 32 to reach a specified level, upon which a "switch buffer" command is sent at 52 to the buffer manager 25 at the video streamer 2 via the connection 28. The buffer manager 25 then switches the flow of data from the low bit-rate data buffer 23 to the high bit-rate data buffer 24 and instructs transmission at a rate $T_s=T_E$. Using the example encoding rate cited above, data is transmitted on the network at 1500 kbits$^{-1}$.

The client buffer 32 will then begin filling with high quality data which will be placed behind the low quality data. After a length of time the $R_H$ data will begin to be read into the decoder 33, whereupon the user will perceive an increase in the picture quality. At this point, the client 3 has a full buffer and the user is watching images of a quality which is consistent with the capacity of the network link.

The video streamer 2 can support a number of clients (typically 1000). Each client is initially given a unique read-out point for the start-up phase, whereupon, after equilibrium of the client buffer 32 has been reached and the video streamer 2 is supplying high bit-rate data from the buffer 24, the read-out point can be amalgamated with other client read-out points. Read-out points may have to be devolved as discrepancies in network capacity demand increasing or decreasing the transmission rate for a particular client.

The skilled person will appreciate that the low bit-rate data buffer 23 should be of a size which will allow data to be read from it at a rate $2T_E$ for a period of time which is long enough to provide the client buffer 32 with a suitable quantity of data. For example, in order to buffer 5 seconds worth of 500 kbits$^{-1}$ data at the client 3, the video streamer 2 must supply 1000 kbits of data for 5 seconds, 500 kbits of which will be consumed by the decoder 33 per second and 500 kbits will build up in the buffer per second until 5 seconds has elapsed. Therefore the low bit-rate data buffer must be able to hold at least 5 Mbits of data (5×1000 kbits), or just over 0.5 Mb.

The skilled person will appreciate that there are problems associated with 'tapping into' a stream of encoded data when data is initially read out of a buffer. The compression technology typically employed by the encoder 1 involved coding a frame of video data, termed an anchor frame or an I-frame and from this frame an estimate is made as to what the next frame will look like, this estimated frame being termed a B-frame. In this way the quantity of data representing a series of frames may be greatly reduced. However, if the first frame to be read from either of the data buffers 23, 24 is a B-frame then the first few frames of decoded data may be unintelligible as the decoder tries to reconstruct frames based on an estimate. In a further embodiment of the invention, an extra buffer of data is supplied in parallel with the data buffers 23, 24 consisting solely of I-frames. The first frame to be transmitted is read from the I-frame buffer and thus gives the decoder a reliable point from which to start decoding. Data is then switched to be read from either of the data buffers 23, 24.

The system allows user-friendly video streaming, i.e. the quality of the video does not fluctuate rapidly as network conditions vary, which can have a detrimental affect on the overall perceived quality of the media. In the event of packet loss being reported by the client, the system can exponentially reduce its transmission rate. This need not result in an immediate switching of the video source, as there may be data buffered at the client. Immediately after the packet loss it is possible that the transmission rate is lower than the encoding rate, and the client is supplementing received data with buffered data in order to meet the demands of the video decoder, with the result that the client's buffer is emptying. In the event of isolated packet loss, the system can again ramp up the transmission rate, initially slowing the rate at which the client's buffer is emptying before eventually returning to a state of filling it.

The skilled person will appreciate that the ability to transmit data at variable rates for a period of time enables the streamed data to be elastic and allows TCP-friendly transmission. Detection of sustained packet loss by the packet loss detector 31 is indicative of network congestion. The buffer manager 25 at the video streamer 2 reacts to notification of packet loss by instructing a reduction in the transmission rate of data from the high bit-rate data buffer 24. The high bit-rate data buffer 24 should be appropriately sized to cope with such an event. If packet loss persists at the reduced transmission rate for longer than the high bit-rate data buffer can sustain, then the buffer manager 25 will switch to supply data from the low bit-rate data buffer 23. Effective management protocols are necessary to prevent rapid switching between data buffers 23 and 24 as the data capacity of the network fluctuates, because this will cause changes in the perceived quality of the played back video. While a user will tolerate low quality playback, rapid changes in quality can be irritating to a user.

There is no limit to the number of encoded data streams that may be provided to the video streamer. Maximum bandwidth utilisation may be achieved thus: starting by reading data from a low bit-rate data buffer, the transmission rate is increased. Finding that no packets are lost at this transmission rate, the output is switched to a higher bit-rate data buffer, whereupon the transmission rate is increased. If this transmission rate encounters no obstacle then a higher still bit-rate data buffer can be switched in, and so on until the maximum bandwidth is employed.

The buffer manager 25 located at the video streamer 2 is enabled to decide how to adjust the transmission rate $T_S$ and when to switch buffers. Equally, instructions may be sent from the client 3 to the video streamer 2 about transmission rate $T_S$ and which buffer to feed data from. The location of the buffer manager 25 in the embodiments described has been chosen because it is practical to situate the control centre close to the centre which is responsible for charging for the service, which in this case is the ISP.

The example of video data is chosen as an example of multimedia data to illustrate the above embodiments. The invention is equally suited to any other form of time-sensitive data, such as audio data or a multimedia presentation.

In the embodiment described above, data is supplied by the encoder 1. Equally, compressed video data may be held in a library of program data files, for example a library of feature films, which may be accessed when required.

The video streamer 2 may be remote from the encoder 1, such that the video streamer 2 and the encoder 1 are connected via the Internet. It is likely that the video streamer 2 would be operated by an Internet Service Provider (ISP) and remote connection of the video streamer 2 and encoder 1, would allow the ISP to make content available to the client from many encoders.

The invention claimed is:

1. A method of operating a real-time communication apparatus comprising a real-time data sender, a real-time data display device having a store, and a network connecting said sender and said display device, said method comprising:
   operating said sender to transmit a plurality of first-encoding-rate data packets encoded at a first encoding rate and representing a first part of a real-time presentation to said display device at a transmission rate higher than said first encoding rate of said first-encoding-rate data packets;
   operating said display device to:
   receive said first-encoding-rate data packets into said store;
   read-out said received first-encoding-rate data packets from said store at a data rate equal to said first encoding rate of said first-encoding-rate data packets for decoding so as to present said first part of said real-time presentation to a user at a first level of quality;
   on said store being filled with said first-encoding-rate data to a predetermined level, sending an indication that said level has been reached to said data sender;
   operating said data sender, on receipt of said indication from said display device, to send second-encoding-rate data packets encoded at a second encoding rate and representing subsequent parts of said real-time presentation to said display device, said second encoding rate of said second-encoding-rate data packets being higher than said first encoding rate of said first-encoding-rate data packets;
   operating said display device to:
   receive the second-encoding-rate data packets representing the subsequent part of real-time presentation into said store;
   read out said second-encoding-rate data packets from said store at a data rate equal to said second encoding rate of said second-encoding-rate data packets for decoding so as to present said subsequent part of said real-time presentation to said user at a second level of quality which is higher than said first level of quality.

2. A operating a real-time communication system according to claim 1, wherein:
   the rates at which the first-encoding-rate or second-encoding-rate data packets are written into said store are dependent on the quantity of data in the store.

3. A method of operating a real-time communication system in accordance with claim 1, wherein said real-time presentation represents, at least in part, video data.

4. A method of operating a communication apparatus comprising a data sender, a data presentation device having a store, and a network connecting said data sender and said data presentation device, said method comprising:
   operating said data sender to transmit a first plurality of first-encoding-rate data packets encoded at a first encoding rate to said data presentation device, wherein said first plurality of first-encoding-rate data packets are transmitted at a first transmission rate which is higher than said first encoding rate of said first-encoding-rate data packets;
   operating said data presentation device to:
   receive said first plurality of first encoding rate data packets into said store;
   read out said received first-encoding-rate data packets from said store at a data rate equal to said first encoding rate of said first-encoding-rate data packets for decoding so as to present to a user at a first level of quality, wherein the removing of said first-encoding-rate data packets from said store is initiated when said first-encoding-rate data packets first arrive at said store;
   on said store being filled with data packets to a predetermined level, sending an indication to said data sender that said predetermined level has been reached;
   operating said data sender, on receipt of said indication from said data presentation device, to transmit a second plurality of second-encoding-rate data packets encoded at a second encoding rate to said data presentation device, wherein said second plurality of second-encoding-rate data packets are transmitted at a second transmission rate which is higher than said first transmission rate; and wherein said second encoding rate is higher than said first encoding rate;
   operating said data presentation device to:
   receive said second plurality of second-encoding-rate data packets into said store;
   read out said second-encoding-rate data packets from said store at a data rate equal to said second encoding rate of said second-encoding-rate data packets for decoding, so as to present to said user at a second level of quality, wherein said second level of quality is higher than said first level of quality.

5. A method of operating a real-time communication apparatus comprising a real-time data sender, a real-time data display device having a store, and a network connecting said sender and said display device, said method comprising:
   operating said sender to transmit a plurality of first-encoding-rate data packets encoded at a first encoding rate and representing a first part of a real-time presentation to said display device at a transmission rate higher than said first encoding rate of said first-encoding-rate data packets;
   operating said display device to:
   receive said first-encoding-rate data packets into said store;
   read-out said received first-encoding-rate data packets from said store at a data rate equal to said first encoding rate of said first-encoding-rate data packets for decoding so as to present said first part of said real-time presentation to a user at a first level of quality;
   on said store being filled with said first-encoding-rate data to a predetermined level, sending an indication that said level has been reached to said data sender;
   operating said data sender, on receipt of said indication from said display device, to send second-encoding-rate data packets encoded at a second encoding rate and representing subsequent parts of said real-time presentation to said display device, said second encoding rate of said second-encoding-rate data packets being higher than said first encoding rate of said first-encoding-rate data packets;

operating said display device to:
receive the second-encoding-rate data packets representing the subsequent part of real-time presentation into said store;
read out said second-encoding-rate data packets from said store at a data rate equal to said second encoding rate of said second-encoding-rate data packets for decoding so as to present said subsequent part of said real-time presentation to said user at a second level of quality which is higher than said first level of quality;
wherein said display device sends packet loss information to the sender and
in response to receiving said packet loss information, said sender reduces the transmission rate of said second-encoding rate data packets to the display device.

6. A method according to claim 5, wherein said sender determines whether sustained packet loss has occurred and
in response to such a determination, sends first encoding rate data packets to the display device.

7. A real-time communication system comprising:
a real-time data sender;
a real-time data display device having a store; and
a network connecting said sender and said display device, wherein:
said sender is operable to transmit first-encodingrate data packets encoded at a first encoding rate and representing a first part of a real-time presentation to said display device with a transmission rate higher than said first encoding rate of said first-encoding-rate data packets;
said display device being operable to:
receive said first-encoding rate data packets into said store;
read out said received first-encoding-rate data packets from said store at a data rate equal to said first encoding rate of said first-encoding-rate data packets for decoding, so as to present said first part of said real-time presentation to a user at a first level of quality; and
on said store being filled with said first encoding rate data to a predetermined level, sending an indication that said level has been reached to said sender:
characterised in that:
said sender is operable, on receipt of said indication, to send second-encoding-rate data packets encoded at a second encoding rate and representing subsequent parts of said real-time presentation to said display device, said second encoding rate of said second-encoding-rate data packets being higher than said first encoding rate of said first-encoding-rate data packets;
wherein said display device is further operable to:
receive second encoding rate data packets representing a subsequent part of the real-time presentation into said store;
read out the second encoding rate data packets from said store at a data rate equal to said second encoding rate of said second-encoding-rate data packets for decoding, so as to present said subsequent part of said real-time presentation to said user at a second level of quality which is higher than said first level of quality.

8. A real-time communication system comprising:
a real-time data sender;
a real-time data display device having a store; and
a network connecting said sender and said display device, wherein:
said sender is operable to transmit first-encoding-rate data packets encoded at a first encoding rate and representing a first part of a real-time presentation to said display device with a transmission rate higher than said first encoding rate of said first-encoding-rate data packets;
said display device being operable to:
receive said first-encoding rate data packets into said store;
read out said received first-encoding-rate data packets from said store at a data rate equal to said first encoding rate of said first-encoding-rate data packets for decoding, so as to present said first part of said real-time presentation to a user at a first level of quality; and
on said store being filled with said first encoding rate data to a predetermined level, sending an indication that said level has been reached to said sender:
characterised in that:
said sender is operable, on receipt of said indication, to send second-encoding-rate data packets encoded at a second encoding rate and representing subsequent parts of said real-time presentation to said display device, said second encoding rate of said second-encoding-rate data packets being higher than said first encoding rate of said first-encoding-rate data packets;
wherein said display device is further operable to:
receive second encoding rate data packets representing a subsequent part of the real-time presentation into said store;
read out the second encoding rate data packets from said store at a data rate equal to said second encoding rate of said second-encoding-rate data packets for decoding, so as to present said subsequent part of said real-time presentation to said user at a second level of quality which is higher than said first level of quality
wherein said display device further comprises packet loss detecting means for detecting packet loss and sending packet loss information to the sender; and
in response to receiving said packet loss information, said sender is further operable to reduce the transmission rate of said second encoding rate data packets to the display device.

9. A system according to claim 8, wherein said sender further comprises determining means for determining whether sustained packet loss has occurred; and
in response to said determining means making a determination of sustained packet loss, sending first encoding rate data packets to the display device.

10. A real-time data display device configured to communicate with a real-time data sender over a network, the real-time data display device comprising:
a store; and
a processing system having a configuration operable to:
receive, at the display device and from the real-time data sender, first-encoding-rate data packets encoded at a first encoding rate and representing a first part of a real-time presentation for said display device with a transmission rate higher than said first encoding rate of said first-encoding-rate data packets;
receive said first-encoding rate data packets into said store;
read out said received first-encoding-rate data packets from said store at a data rate equal to said first encoding rate of said first-encoding-rate data packets for decoding, so as to present said first part of said real-time presentation to a user at a first level of quality;
on said store being filled with said first encoding rate data to a predetermined level, send an indication that said level has been reached to said sender;
after the indication has been sent, receive, at the display device and from the real-time data sender, second-encoding-rate data packets encoded at a second encoding rate and representing subsequent parts of said real-time presentation for said display device, said second encoding rate of said second-encoding-rate data packets being higher than said first encoding rate of said first-encoding-rate data packets;

receive second encoding rate data packets representing a subsequent part of the real-time presentation into said store; and read out the second encoding rate data packets from said store at a data rate equal to said second encoding rate of said second-encoding-rate data packets for decoding, so as to present said subsequent part of said real-time presentation to said user at a second level of quality which is higher than said first level of quality.

11. A real-time data display device according to claim 10 wherein:

said processing system is configured to detect packet loss and send packet loss information to the sender; and the display device is configured to, after sending said packet loss information, receive said second encoding rate data packets at a reduced rate.

12. A real-time data display device according to claim 11, wherein the display device is configured to, after a determination that sustained packet loss has occurred, receive first encoding rate data packets at the display device.

* * * * *